United States Patent
Suzuki et al.

(10) Patent No.: US 10,665,096 B2
(45) Date of Patent: *May 26, 2020

(54) NON-TRANSITORY STORAGE MEDIUM STORING IMAGE TRANSMISSION PROGRAM, IMAGE TRANSMISSION DEVICE, AND IMAGE TRANSMISSION METHOD

(71) Applicant: TOYOTA JIDOSHA KABUSHIKI KAISHA, Toyota-shi (JP)

(72) Inventors: Koichi Suzuki, Miyoshi (JP); Junichiro Igawa, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,375

(22) Filed: Apr. 26, 2018

(65) Prior Publication Data

US 2018/0315304 A1 Nov. 1, 2018

(30) Foreign Application Priority Data

Apr. 28, 2017 (JP) ................. 2017-089693

(51) Int. Cl.
*G08G 1/01* (2006.01)
*G06K 9/00* (2006.01)
(Continued)

(52) U.S. Cl.
CPC ....... *G08G 1/0112* (2013.01); *G06F 16/5854* (2019.01); *G06K 9/00791* (2013.01);
(Continued)

(58) Field of Classification Search
CPC .............. G08G 1/0112; G06K 9/00791; G06T 2207/30252; G06T 7/70; H04N 7/188; G06F 17/30259
(Continued)

(56) References Cited

U.S. PATENT DOCUMENTS 8,400,619 B1  3/2013  Bachrach
10,255,670 B1  4/2019  Wu
(Continued)

FOREIGN PATENT DOCUMENTS

JP  2014-163814  9/2014

OTHER PUBLICATIONS

U.S. Office Action dated Aug. 2, 2019 in U.S. Appl. No. 15/964,681, citing documents AA-AK therein, 20 pages.
(Continued)

*Primary Examiner* — Hee-Yong Kim
(74) *Attorney, Agent, or Firm* — Oblon, McClelland, Maier & Neustadt, L.L.P.

(57) ABSTRACT

A non-transitory storage medium storing an image transmission program that is executed on an in-vehicle device mounted in a vehicle having an imaging unit configured to image surroundings of the vehicle to acquire an image and a communication unit configured to perform communication with an information center, the image transmission program includes: an image acquisition step of causing the imaging unit to acquire an image relating to an intersection based on whether or not a mark target facing the intersection is prominent; and a transmission step of causing the communication unit to transmit the image acquired to the information center.

10 Claims, 7 Drawing Sheets

(51) Int. Cl.
*H04N 7/18* (2006.01)
*G06T 7/70* (2017.01)
*G06F 16/583* (2019.01)
*G08G 1/0968* (2006.01)
*G08G 1/04* (2006.01)
*G08G 1/0967* (2006.01)
*G08G 1/0969* (2006.01)

(52) U.S. Cl.
CPC .......... *G06K 9/00818* (2013.01); *G06T 7/70* (2017.01); *G08G 1/0141* (2013.01); *G08G 1/04* (2013.01); *G08G 1/0969* (2013.01); *G08G 1/096716* (2013.01); *G08G 1/096822* (2013.01); *G08G 1/096838* (2013.01); *G08G 1/096861* (2013.01); *H04N 7/188* (2013.01); *G06T 2207/30252* (2013.01)

(58) Field of Classification Search
USPC ........................................................ 348/113
See application file for complete search history.

(56) References Cited

U.S. PATENT DOCUMENTS

| 2004/0016870 | A1 | 1/2004 | Pawlicki |
| 2004/0167667 | A1* | 8/2004 | Goncalves ............ G01C 21/12 700/245 |
| 2007/0026871 | A1 | 2/2007 | Wager |
| 2012/0042288 | A1* | 2/2012 | Liao ................... H04N 1/00129 715/863 |
| 2014/0085107 | A1 | 3/2014 | Gutierrez |
| 2016/0176358 | A1 | 6/2016 | Raghu |
| 2017/0046891 | A1 | 2/2017 | Trivelpiece |
| 2017/0160743 | A1 | 6/2017 | Schweikl |
| 2018/0033307 | A1 | 2/2018 | Tayama |
| 2018/0113209 | A1 | 4/2018 | Campbell |
| 2018/0252539 | A1 | 9/2018 | Yunoki |
| 2018/0314901 | A1 | 11/2018 | Suzuki et al. |

OTHER PUBLICATIONS

Notice of Allowance issued in U.S. Appl. No. 15/964,681 dated Dec. 12, 2019.

* cited by examiner

FIG. 4

| POI | LATITUDE/LONGITUDE | PROMINENT CHAIN FLAG |
|---|---|---|
| POI001 | F (X1, Y1) | 1 |
| POI002 | F (X2, Y2) | 0 |
| ⋮ | ⋮ | ⋮ |

FIG. 5

| POI | LATITUDE/LONGITUDE | GENRE FLAG |
|---|---|---|
| POI001 | F (X11, Y11) | 1 |
| POI002 | F (X22, Y22) | 0 |
| ⋮ | ⋮ | ⋮ |

FIG. 6

| LINK ID | MULTIPLE-LANE FLAG |
|---------|--------------------|
| L001    | 1                  |
| L002    | 0                  |
| ⋮       | ⋮                  |

FIG. 7

| INTERSECTION ID | LATITUDE/LONGITUDE | IMAGE ID | POI    |
|-----------------|--------------------|----------|--------|
| ID001           | F (X1, Y1)         | IM001    | POI001 |
| ID002           | F (X2, Y2)         | IM002    | POI002 |
| ⋮               | ⋮                  | ⋮        | ⋮      |

NON-TRANSITORY STORAGE MEDIUM STORING IMAGE TRANSMISSION PROGRAM, IMAGE TRANSMISSION DEVICE, AND IMAGE TRANSMISSION METHOD

INCORPORATION BY REFERENCE

The disclosure of Japanese Patent Application No. 2017-089693 filed on Apr. 28, 2017 including the specification, drawings and abstract is incorporated herein by reference in its entirety.

BACKGROUND

1. Technical Field

The present disclosure relates to a non-transitory storage medium storing an image transmission program, an image transmission device, and an image transmission method.

2. Description of Related Art

In the related art, in a case where there is an intersection (hereinafter, referred to as a guide intersection) to be guided, such as right or left turn, in front of a vehicle in a moving direction, guidance of the guide intersection is performed. In the above-described case, mark target candidates that are candidates for a mark target to be a mark are acquired, and in a case where a mark target candidate is used as a mark target in the past, appropriateness of the mark target candidate as a mark is determined based on a visual recognition form of an occupant to the mark target candidates accompanied with passing through the guide intersection. A traveling guidance system configured to perform guidance of the guide intersection using a mark target candidate having appropriateness equal to or greater than a reference value as a mark target among the mark target candidates at the guide intersection based on the determination is known (for example, see Japanese Unexamined Patent Application Publication No. 2014-163814 (JP 2014-163814 A)).

SUMMARY

In the traveling guidance system of the related art, there is no disclosure concerning a method of efficiently collecting data of the mark target candidates. In particular, there is no disclosure concerning efficient data collection at an intersection where collection is not needed.

The disclosure provides a non-transitory storage medium storing an image transmission program, an image transmission device, and an image transmission method capable of efficiently collecting an image at an intersection.

A first aspect of the disclosure relates to a non-transitory storage medium storing an image transmission program that is executed on an in-vehicle device mounted in a vehicle having an imaging unit configured to image surroundings of the vehicle to acquire an image and a communication unit configured to perform communication with an information center. The image transmission program includes an image acquisition step of causing the imaging unit to acquire an image relating to an intersection based on whether or not a mark target facing the intersection is prominent, and a transmission step of causing the communication unit to transmit the acquired image to the information center. The information center may be, for example, a traffic information center, a probe center, or the like.

For this reason, it is possible to more reliably reduce the amount of data of an image transmitted to the information center based on whether or not the mark target facing the intersection is prominent.

Accordingly, it is possible to provide a non-transitory storage medium storing an image transmission program capable of efficiently collecting an image at an intersection.

In the non-transitory storage medium according to the first aspect of the disclosure, the image acquisition step of the image transmission program may include specifying whether or not the mark target is prominent with reference to a database configured to store the mark target in association with information indicating whether or not the mark target is prominent, and causing the imaging unit to acquire the image relating to the intersection based on whether or not the mark target is prominent.

For this reason, it is possible to specify whether or not the mark target facing the intersection is prominent with reference to the database, and to more reliably reduce the amount of data of an image transmitted to the information center based on a specification result.

Accordingly, it is possible to provide a non-transitory storage medium storing an image transmission program capable of more reliably and efficiently collecting an image at an intersection based on a result of specification about whether or not the mark target facing the intersection is prominent with reference to the database.

In the non-transitory storage medium according to the first aspect of the disclosure, the image acquisition step of the image transmission program may include causing the imaging unit to acquire an image relating to the intersection in a case where the mark target is not prominent, and causing the imaging unit not to acquire the image relating to the intersection in a case where the mark target is prominent.

For this reason, it is possible to transmit, to the information center, an image relating to the intersection acquired in a case where mark target is not prominent, without acquiring an image relating to the intersection in a case where the mark target is prominent.

Accordingly, it is possible to provide a non-transitory storage medium storing an image transmission program capable of efficiently collecting an image at an intersection by acquiring an image of a non-prominent mark target facing an intersection.

In the non-transitory storage medium according to the first aspect of the disclosure, the image acquisition step of the image transmission program may include causing the imaging unit to acquire the image relating to the intersection based on whether or not the mark target is prominent in a case where the mark target is positioned at a left front corner or a left back corner of the intersection in left-hand traffic or at a right front corner or a right back corner of the intersection in right-hand traffic.

For this reason, it is possible to acquire an image based on whether or not a mark target that is positioned at a left front corner or a left back corner of an intersection in left-hand traffic or at a right front corner or a right back corner of an intersection in right-hand traffic is prominent. A mark target that is positioned at a left front corner or a left back corner of an intersection in left-hand traffic or at a right front corner or a right back corner of an intersection in right-hand traffic is at a position easy to view from the vehicle.

Accordingly, it is possible to provide a non-transitory storage medium storing an image transmission program capable of efficiently collecting an image at an intersection by strictly selecting an image of a mark target at a position easy to view from the vehicle based on whether or not the mark target is prominent and acquiring an image.

In the non-transitory storage medium according to the first aspect of the disclosure, the image acquisition step of the image transmission program may include causing the imaging unit not to acquire the image relating to the intersection in a case where the mark target is positioned at a left front corner or a left back corner of the intersection in left-hand traffic or at a right front corner or a right back corner of the intersection in right-hand traffic.

For this reason, it is possible to prevent acquisition of an image of a mark target that is positioned at a left front corner or a left back corner of an intersection in left-hand traffic or at a right front corner or a right back corner of an intersection in right-hand traffic. A mark target that is positioned at a left front corner or a left back corner of an intersection in left-hand traffic or at a right front corner or a right back corner of an intersection in right-hand traffic is at a position easy to view from the vehicle.

Accordingly, it is possible to provide a non-transitory storage medium storing an image transmission program capable of efficiently collecting an image at an intersection by preventing acquisition of an image of a mark target at a position easy to view from the vehicle.

In the non-transitory storage medium according to the first aspect of the disclosure, the image acquisition step of the image transmission program may include specifying that the mark target is prominent in a case where the mark target is a chain satisfying a predetermined condition or has a predetermined feature in appearance.

For this reason, it is possible to determine whether or not to acquire an image for a prominent mark target corresponding to a chain satisfying a predetermined condition or a case where there is a predetermined feature in appearance.

Accordingly, it is possible to provide a non-transitory storage medium storing an image transmission program capable of efficiently collecting an image at an intersection by determining whether or not to acquire an image of a prominent mark target corresponding to a chain satisfying a predetermined condition or a case where there is a predetermined feature in appearance.

In the non-transitory storage medium according to the first aspect of the disclosure, the image acquisition step of the image transmission program may include causing the imaging unit to acquire the image relating to the intersection at a place between a position in front of the intersection by a predetermined distance and the intersection.

For this reason, it is possible to restrict a section where the imaging unit is caused to acquire an image, to a place between a position in front of an intersection by a predetermined distance and the intersection.

Accordingly, it is possible to provide a non-transitory storage medium storing an image transmission program capable of efficiently collecting an image at an intersection by restricting a section where the imaging unit is caused to acquire an image, to a place between a position in front of the intersection by a predetermined distance and the intersection.

A second aspect of the disclosure relates to an image transmission device that is mounted in a vehicle having an imaging unit configured to image surroundings of the vehicle to acquire an image and a communication unit configured to perform wireless data communication with an information center. The image transmission device includes an electronic control unit configured to cause the imaging unit to acquire an image relating to an intersection based on whether or not a mark target facing the intersection is prominent, and cause the communication unit to transmit the acquired image to the information center.

For this reason, it is possible to more reliably reduce the amount of data of an image transmitted to the information center based on whether or not the mark target facing the intersection is prominent.

Accordingly, it is possible to provide an image transmission device capable of efficiently collecting an image at an intersection.

In the image transmission device according to the second aspect of the disclosure, the electronic control unit may be configured to specify whether or not the mark target is prominent with reference to a database configured to store the mark target in association with information indicating whether or not the mark target is prominent, and cause the imaging unit to acquire the image relating to the intersection based on whether or not the mark target is prominent.

For this reason, it is possible to specify whether or not the mark target facing the intersection is prominent with reference to the database, and to more reliably reduce the amount of data of an image transmitted to the information center based on a specification result.

Accordingly, it is possible to provide an image transmission device capable of more reliably and efficiently collecting an image at an intersection based on a result of specification about whether or not the mark target facing the intersection is prominent with reference to the database.

A third aspect of the disclosure relates to an image transmission method that is executed on an in-vehicle device mounted in a vehicle having an imaging unit configured to image surroundings of the vehicle to acquire an image, and a communication unit configured to perform communication with an information center. The image transmission method includes causing the imaging unit to acquire an image relating to an intersection based on whether or not a mark target facing the intersection is prominent, and causing the communication unit to transmit the acquired image to the information center.

According to the aspects of the disclosure, it is possible to provide a non-transitory storage medium storing an image transmission program, an image transmission device, and an image transmission method capable of efficiently collecting an image at an intersection.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram showing the data structure of a database having a POI, a latitude/longitude, and a prominent chain flag associated with one another;

FIG. 5 is a diagram showing the data structure of a database having a POI, a latitude/longitude, and a genre flag associated with one another;

FIG. 6 is a diagram showing the data structure of a database having a link ID of a road and a multiple-lane flag associated with each other;

FIG. 7 is a diagram showing the data structure of a database having an intersection ID, a latitude/longitude, an image ID, and a POI associated with one another;

DETAILED DESCRIPTION OF EMBODIMENTS

Hereinafter, an embodiment to which a non-transitory storage medium storing an image transmission program, an image transmission device, and an image transmission method of the disclosure are applied will be described.

Figure 1:
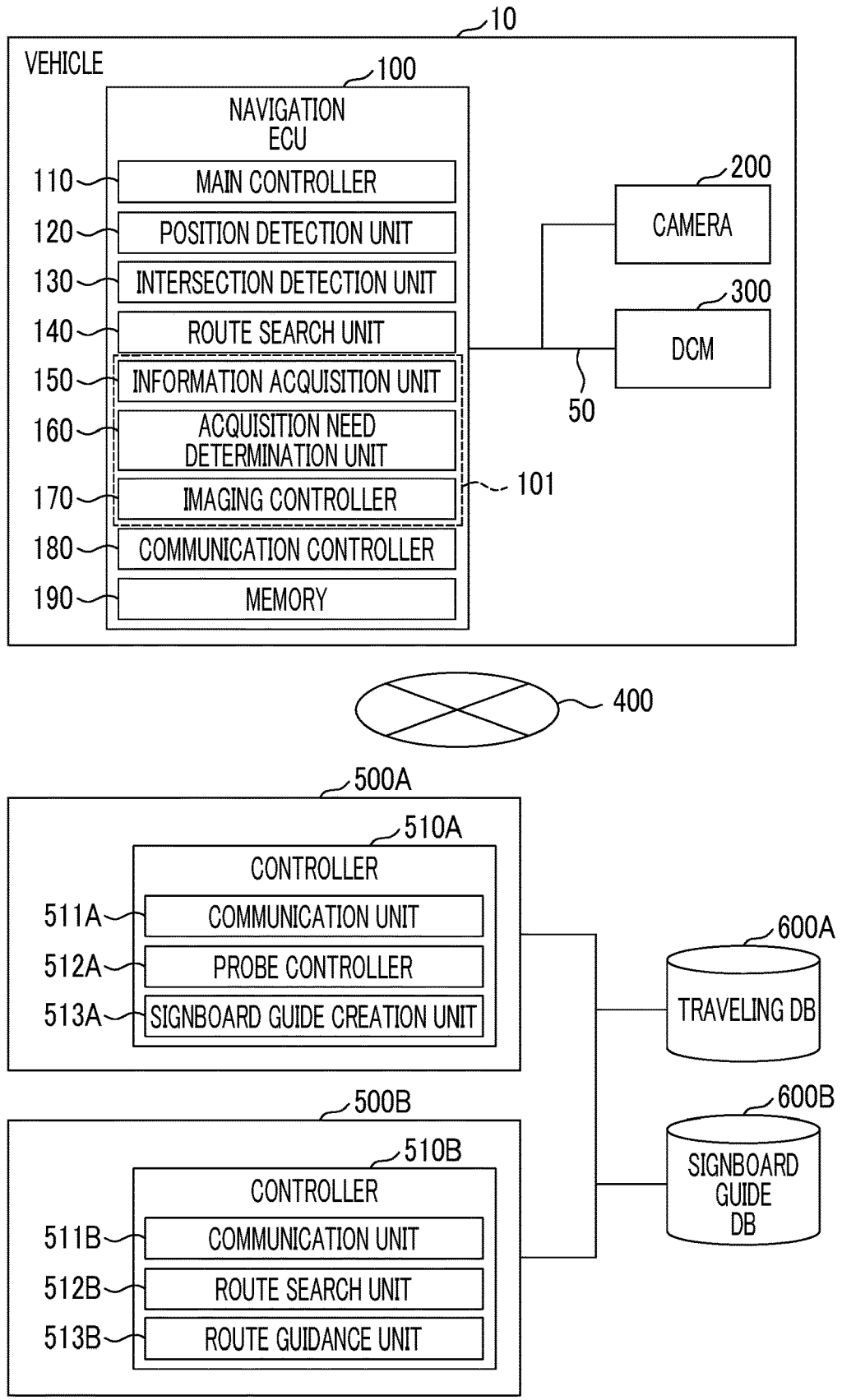
FIG. 1 is a diagram showing the configuration of a route guidance system including a vehicle, a probe storage server, and a navigation server.

FIG. 1 is a diagram showing the configuration of a route guidance system including a vehicle 10, a probe storage server 500A, and a navigation server 500B. In the vehicle 10, a navigation electronic control unit (ECU) 100, a camera 200, and a data communication module (DCM) 300 are mounted. The navigation ECU 100, the camera 200, and the DCM 300 are connected to perform communication with one another through a controller area network (CAN) 50 as an example. The navigation ECU 100 can perform wireless data communication with the probe storage server 500A and the navigation server 500B through the DCM 300 and a network 400. The probe storage server 500A and the navigation server 500B are an example of an information center or a data center needed for route guidance.

Although a form in which the CAN 50 based on a CAN protocol is used as a network inside the vehicle 10 has been described, a bus other than a CAN, such as a bus using an Ethernet (Registered Trademark) protocol, may be used instead of the CAN 50. Although various devices or equipment other than the above-described devices or equipment are mounted in the vehicle 10, in FIG. 1, constituent elements particularly related to the embodiment are extracted and shown.

The vehicle 10 is, for example, a hybrid vehicle (HV), a plug-in hybrid vehicle (PHV), an electric vehicle (EV), a gasoline vehicle, a diesel vehicle, or the like. The navigation ECU 100 is mounted in the vehicle 10.

The navigation ECU 100 performs control of a navigation system mounted in the vehicle 10. The navigation ECU 100 includes an image transmission device of the embodiment. Here, description will be provided focusing on a portion relating to the image transmission device in the navigation ECU 100.

The navigation ECU 100 is implemented by a computer including a central processing unit (CPU), a random access memory (RAM), a read only memory (ROM), a hard disk drive (HDD), an input/output interface, a communication interface, an internal bus, and the like as an example.

A program that makes the computer as the navigation ECU 100 have a function as an image transmission device is installed on the computer through a computer-readable storage medium or is downloaded from another computer system through a modem or the like connected to the network 400, such as the Internet, and installed on the computer.

The navigation ECU 100 includes a main controller 110, a position detection unit 120, an intersection detection unit 130, a route search unit 140, an information acquisition unit 150, an acquisition need determination unit 160, an imaging controller 170, a communication controller 180, and a memory 190. The main controller 110, the position detection unit 120, the intersection detection unit 130, the information acquisition unit 150, the acquisition need determination unit 160, the imaging controller 170, and the communication controller 180 represent the functions of the program executed by the navigation ECU 100 as functional blocks. The memory 190 functionally represents a portion that stores data like the RAM, the ROM, and the HDD included in the navigation ECU 100.

In the navigation ECU 100, at least the information acquisition unit 150, the acquisition need determination unit 160, the imaging controller 170, the communication controller 180, and the memory 190 constitute the image transmission device. The image transmission device may further include the main controller 110, the position detection unit 120, or the intersection detection unit 130. The information acquisition unit 150, the acquisition need determination unit 160, and the imaging controller 170 constitute an image acquisition unit 101.

The main controller 110 is a processing unit that performs processing other than processing performed by the position detection unit 120, the intersection detection unit 130, the information acquisition unit 150, the acquisition need determination unit 160, the imaging controller 170, and the communication controller 180, and integrates processing of the navigation ECU 100.

The position detection unit 120 is connected to a global positioning system (GPS) antenna, and acquires position data and time data from GPS signals. The position data acquired by the position detection unit 120 is data representing a current position (latitude and longitude) of the vehicle 10, and the time data is data representing a current time. The position data and the time data are used for processing that is performed by the main controller 110, and are output to the CAN 50.

The intersection detection unit 130 detects an intersection in a moving direction of the vehicle 10 based on the current position of the vehicle 10 and map data (electronic map). Specifically, the intersection detection unit 130 acquires the current position of the vehicle 10 obtained from the navigation system and detects an intersection represented by a node in the moving direction on a link representing a road including the current position in the map data.

The intersection detection unit 130 calculates a distance to the intersection based on the current position (latitude and longitude) of the vehicle 10 obtained from the navigation system and a position (latitude and longitude) of the intersection represented by the node in the moving direction on the link representing the road, on which the vehicle 10 is traveling currently, in the map data.

The route search unit 140 receives information, such as a destination input to the navigation system by a user of the vehicle 10 and transmits information, such as the destination, and the position data representing the current position of the vehicle 10 to the navigation server 500B. The route search unit 140 fits data of route guidance received from the navigation server 500B to the map data and displays the data on a display of the navigation system. At this time, the route search unit 140 displays a signboard guide image received from the navigation server 500B on the side of an image of the intersection on the display, and displays guide display, such as "turn left at a OO intersection" on the display. As described above, since the navigation server 500B searches for a route, it is possible to guide a more accurate route and a more accurate arrival time.

The information acquisition unit 150 acquires information, such as a facility, at the intersection from the map data stored in the memory 190. Information, such as a facility, is point of interest (POI) information. The POI information represents an identifier (ID), a name, a category (genre), and a position (latitude and longitude) of a store, a facility, or the like along a road included in the map data. A facility or the like is an example of a mark target that faces an intersection and can become a mark.

The acquisition need determination unit 160 determines an acquisition need of an image relating to an intersection for the camera 200 based on whether or not the POI information satisfies a predetermined condition that the camera 200 is not caused to perform imaging. The reason for determining the acquisition need of the image as described above is as follows; in a case where an image relating to an intersection is acquired by a probe traffic information collection function of the navigation ECU 100 without determining the acquisition need of the image relating to the intersection, the number of images to be acquired may increase, the data capacity of image data uploaded from the data navigation ECU 100 to the probe storage server 500A may become enormous, and the capacity of image data stored in the probe storage server 500A and the navigation server 500B becomes also enormous. In order to efficiently restrain the data capacity of image data uploaded in the above-described case or the capacity of image data stored in the probe storage server 500A and the navigation server 500B from becoming enormous, the acquisition need of the image is determined.

In a case where the POI information satisfies the predetermined condition, the acquisition need determination unit 160 determines that acquisition of the image relating to the intersection by the camera 200 is not needed, strictly selecting an image uploaded to the probe storage server 500A and the navigation server 500B, and efficiently restrains the data capacity of image data uploaded and the capacity of image data stored in the probe storage server 500A and the navigation server 500B from becoming enormous.

In a case where the acquisition need determination unit 160 determines that acquisition of the image relating to the intersection is needed, the imaging controller 170 causes the camera 200 to perform imaging and acquires the image relating to the intersection. The image relating to the intersection is an image of a facility or the like to be a mark of the intersection in probe data (data, such as position data, the degree of congestion, a vehicle speed, and images, obtained when the vehicle 10 travels actually) collected by the probe traffic information collection function. A way of selecting the image of the facility or the like to be a mark of the intersection will be described below along with the predetermined condition.

The communication controller 180 causes the DCM 300 to transmit the image relating to the intersection acquired by the imaging controller 170 to the probe storage server 500A. The communication controller 180 is an example of a transmission controller.

The memory 190 stores the map data, the image transmission program, data needed for executing the image transmission program, and the like. The memory 190 is an example of a storage unit.

The camera 200 is an example of an imaging unit that images surroundings of the vehicle 10 to acquire an image. A single or a plurality of cameras 200 may be provided as long as images in front of and on the side of the vehicle 10 can be acquired. The camera 200 may be configured to acquire an image behind the vehicle in addition to the images in front of and on the side of the vehicle 10.

The DCM 300 is an example of a communication unit or a wireless communication device that is mounted in the vehicle 10, and for example, performs wireless communication through a communication line, such as 3G, LTE, 4G, or 5G. The DCM 300 can be connected to a network 400, such as the Internet, through the above-described communication line. With this, the navigation ECU 100 can perform data communication through the network 400. As an example, hereinafter, it is assumed that the DCM 300 performs wireless communication through 4G.

The probe storage server 500A is a server that collects and stores the probe data uploaded from the navigation ECU 100 of the vehicle 10 through the DCM 300. The probe storage server 500A has a controller 510A, a communication unit 511A, a probe controller 512A, and a signboard guide creation unit 513A. The probe storage server 500A is connected to a traveling database (DB) 600A.

The controller 510A is implemented by a computer including a CPU, a RAM, a ROM, an HDD, an input/output interface, a communication interface, an internal bus, and the like. The communication unit 511A, the probe controller 512A, and the signboard guide creation unit 513A of the controller 510A represent the functions of the program executed by the controller 510A as functional blocks.

The communication unit 511A is a communication interface that is connected to the network 400. The probe storage server 500A is connected to the network 400 through the communication unit 511A, and performs wireless data communication with the navigation ECU 100 of the vehicle 10. Although one vehicle 10 is shown in FIG. 1, since there is actually a plurality of vehicles 10, the communication unit 511A performs wireless data communication with the navigation ECUs 100 of the vehicles 10.

The probe controller 512A stores the probe data (data, such as position data, the degree of congestion, the vehicle speed, and images, obtained when the vehicle 10 travels actually) uploaded from the navigation ECU 100 of the vehicle 10 in the traveling DB 600A.

The signboard guide creation unit 513A recognizes the image of the facility or the like to be a mark of the intersection in the probe data stored in the traveling DB 600A by the probe controller 512A through image processing, and stores the image in the signboard guide DB 600B.

The navigation server 500B is a server that searches for a route and calculates a predicted arrival time according to a request from the navigation ECU 100 of the vehicle 10, and that transmits data of the searched route, the predicted arrival time, and the image of the facility or the like to be a mark of the intersection included in the searched route to the navigation ECU 100 of the vehicle 10.

The navigation server 500B has a controller 510B, a communication unit 511B, a route search unit 512B, and a route guidance unit 513B.

The controller 510B is implemented by a computer including a CPU, a RAM, a ROM, an HDD, an input/output interface, a communication interface, an internal bus, and the like. The communication unit 511B, the route search unit 512B, and the route guidance unit 513B of the controller 510B represent the functions of the program executed by the controller 510B as functional blocks.

The communication unit 511B is a communication interface that is connected to the network 400. The navigation server 500B is connected to the network 400 through the communication unit 511B, and performs wireless data communication with the navigation server 500B and the navigation ECU 100 of the vehicle 10. Although the single vehicle 10 is shown in FIG. 1, since there is actually a plurality of vehicles 10, the communication unit 511B performs wireless data communication with the navigation ECUs 100 of the vehicles 10.

The route search unit 512B performs communication with the navigation ECU 100 of the vehicle 10, and searches for the route and calculates the predicted arrival time based on information of a destination or the like transmitted from the route search unit 140 and the position data. The route search unit 512B transmits data representing the searched route and the calculated predicted arrival time to the navigation ECU 100 of the vehicle 10.

The route guidance unit 513B reads data of the image of the facility or the like to be a mark of the intersection associated with a node included in the searched route from the signboard guide DB 600B, and transmits the read data to the navigation ECU 100 of the vehicle 10 along with data representing the searched route and the calculated predicted arrival time.

Figure 2A:
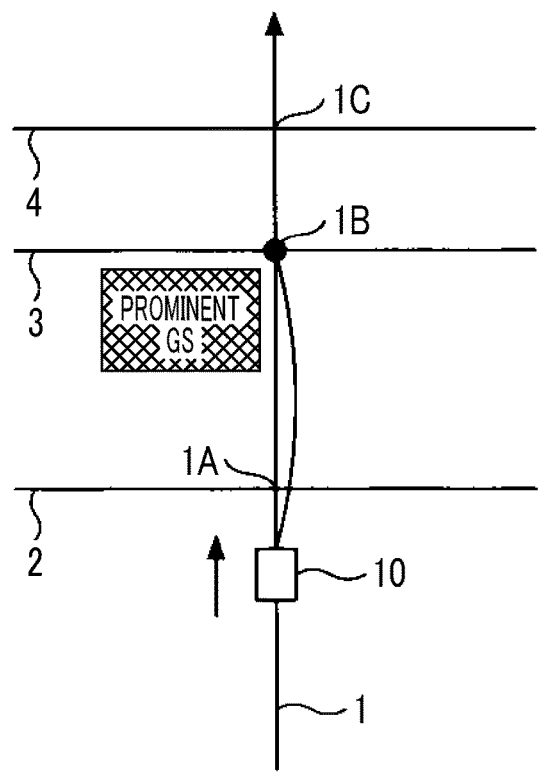
FIG. 2A is a diagram showing the positional relationship of roads, intersections, and a gas station.
Figure 2B:
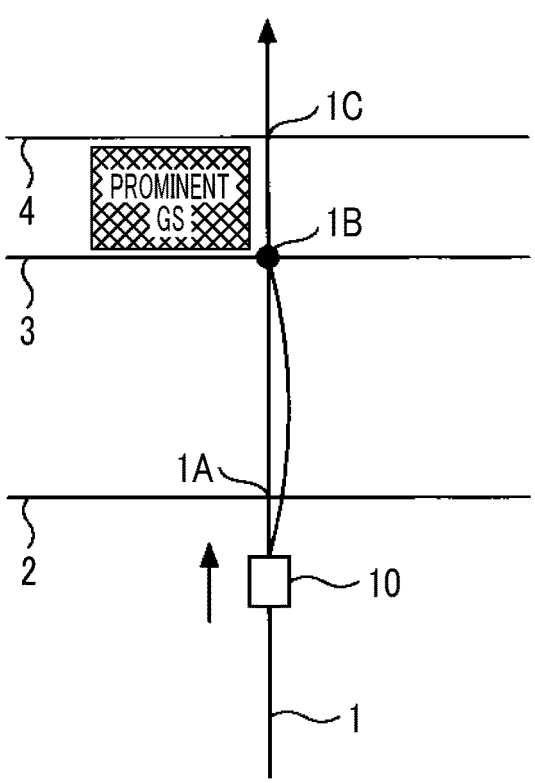
FIG. 2B is a diagram showing the positional relationship of roads, intersections, and a gas station.
Figure 2C:
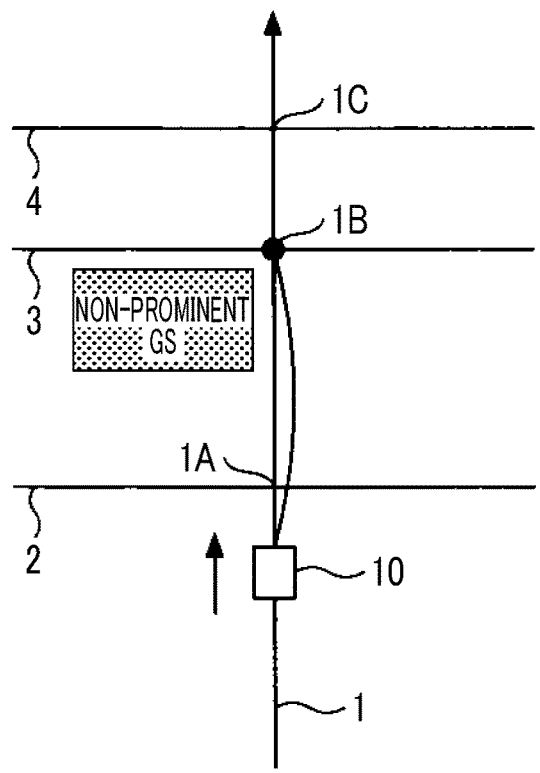
FIG. 2C is a diagram showing the positional relationship of roads, intersections, and a gas station.

The predetermined condition in selecting the image of the facility or the like to be a mark of the intersection will be described. FIGS. 2A to 2C are diagrams showing the positional relationship of roads, intersections, and a gas station. FIGS. 2A to 2C schematically show display on the display of the navigation system. Here, as an example, the vehicle 10 is traveling in a left-hand traffic country or area.

In FIGS. 2A to 2C, the vehicle 10 is moving in a direction (upward direction in the drawing) indicated by an arrow along a road 1. In the moving direction of the vehicle 10, there are roads 2, 3, 4 that cross the road 1. The road 1 and the roads 2, 3, 4 cross each other at intersections 1A, 1B, 1C. The roads 1, 2, 3, 4 are represented by links of the map data, and have unique IDs, respectively. The intersections 1A, 1B, 1C are represented by nodes of the map data, and have unique IDs, respectively.

As an example, in a case where the vehicle 10 approaches a position 300 m in front of an intersection, an image transmission device 100 of the vehicle 10 calculates a distance to the intersection based on the latitude and longitude of a node representing the intersection and the latitude and longitude representing a current position of the vehicle 10. The detection of the intersection and the calculation of the distance are performed by the intersection detection unit 130.

The image transmission device 100 reads a POI of a facility or the like having data of the same latitude and longitude as the latitude and longitude of the node representing the intersection or a POI of a facility or the like having data of the latitude and longitude with a difference in latitude and longitude from the node representing the intersection equal to or less than a predetermined value from the memory 190, and determines the type of facility based on a name and a category (genre) of the facility or the like represented by the POI.

Reading the POI as described above is to estimate a facility facing the intersection. Facing the intersection refers to that a facility is positioned at a corner of the intersection or a facility is at a position, not a corner, facing the intersection like an end portion of a T-shaped road. The predetermined value of the difference in latitude and longitude refers to a difference that may be generated in a case where the latitude and longitude of the node representing the intersection are different from the latitude and longitude of the POI of the facility or the like facing the intersection.

In a case where there is the POI of the facility or the like facing the intersection as described above, the image transmission device 100 determines the need for acquisition of an image of the facility or the like represented by the POI in the following manner. Here, although a case where the image transmission device 100 determines the need for image acquisition to a facility facing the intersection 1B will be described, the same applies to facilities facing the intersections 1A, 1C.

The image transmission device 100 determines not to acquire an image of a facility or the like on the right side of the intersection 1B of the left-hand traffic road 1 since there is a possibility that the visual field of the camera 200 is obstructed by a vehicle traveling on an oncoming lane, a median, a roadside tree, or the like. However, the image transmission device 100 determines the need for image acquisition as follows to a facility or the like at the left front corner of the intersection 1B in order to efficiently restrain the data capacity of uploaded image data and the capacity of image data stored in the probe storage server 500A and the navigation server 500B from becoming enormous.

As shown in FIG. 2A, it is assumed that there is a gas station GS (prominent GS) of a prominent chain on the left front side of the intersection 1B. The user of the vehicle 10 traveling on the left-hand traffic road 1 easily views the left side, and the prominent GS at the left front corner of the intersection 1B in front of the vehicle 10 easily comes into the field of view. For example, the term "prominent" indicates that a facility is widely known when a facility is known nationwide. The term "widely known" indicates that a facility is widely recognized among users (customers) in at least some areas.

The prominent GS is known to many users and becomes a mark easy to understand. For this reason, the image transmission device 100 determines that acquisition of the image of the prominent GS on the left front side of the intersection 1B is not needed in order to reduce the capacity of uploaded image data or stored image data. The determination described above is performed by the acquisition need determination unit 160. Here, although a case where a facility or the like of a prominent chain is a gas station has been described, determination that acquisition of an image is not needed as described above is not limited to a gas station among prominent chains, and may be a facility or the like of a prominent chain of a genre other than a gas station. For example, a convenience store, a drugstore, a bank, or the like of a prominent chain may be applied.

As shown in FIG. 2B, it is assumed that there is a prominent GS on the left back side of the intersection 1B. The prominent GS on the left back side of the intersection 1B easily comes into the field of view of the user of the vehicle 10. For this reason, the image transmission device 100 determines that acquisition of the image of the prominent GS on the left back side of the intersection 1B is not needed in order to reduce the capacity of uploaded image data or stored image data. The determination described above is performed by the acquisition need determination unit 160.

As shown in FIG. 2C, it is assumed that there is a gas station (non-prominent GS) not prominent on the left front side of the intersection 1B. The gas station on the left front side of the intersection 1B is not a prominent chain to the user of the vehicle 10 and is likely to become a mark that is conspicuous to the user.

For this reason, in a case where a genre of a POI is a gas station even though not prominent, the image transmission device 100 determines that acquisition of the image of the non-prominent GS on the left front side of the intersection 1B is not needed in order to reduce the capacity of uploaded image data or stored image data. The determination described above is performed by the acquisition need determination unit 160.

In FIG. 2C, although a case where a non-prominent GS becomes a mark has been described, in a case where even a facility, such as a store not prominent, other than a gas station becomes a mark, determination is made that acquisition of an image is not needed. For example, a convenience store, a drugstore, a bank, or the like becomes a mark that is conspicuous to the user even though not a prominent chain.

For this reason, in a case where a genre of a POI is a convenience store, a drugstore, a bank, or the like even though not prominent, similarly to a case of a gas station, and in a case where a facility, such as a convenience store, a drugstore, or a bank, is on the left front side of the intersection 1B, determination is made that acquisition of an image is not needed. This is because a facility, such as a convenience store, a drugstore, or a bank, is a facility having a feature in appearance even though not prominent.

In FIG. 2C, although a case where a facility, such as a convenience store, a drugstore, or a bank, is on the left front side of the intersection 1B has been described, similarly, in a case where a facility is at the left back corner of the intersection 1B, in a case where a genre of a POI is a gas station, a convenience store, a drugstore, a bank, or the like, determination may be made that acquisition of an image is not needed.

Figure 3:
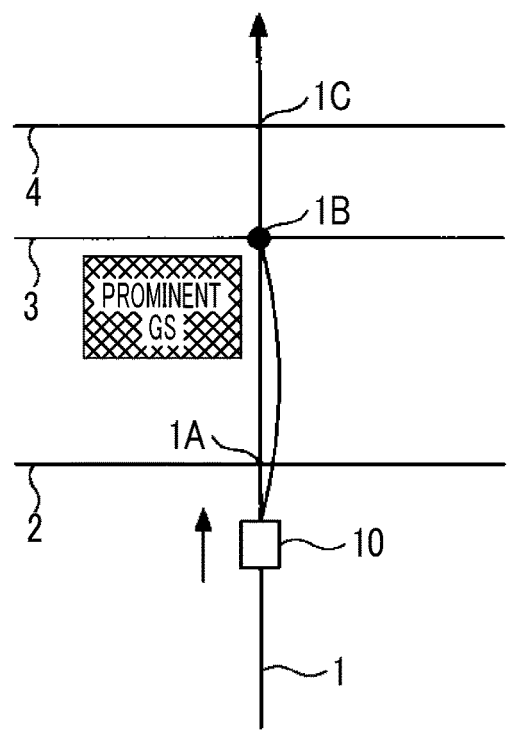
FIG. 3 is a diagram showing the positional relationship of roads, intersections, and a gas station.

FIG. 3 is a diagram showing the positional relationship of roads, intersections, and a gas station GS. Similarly to FIG. 2A, FIG. 2B and FIG. 2C, FIG. 3 shows the vehicle 10, intersections 1A, 1B, 1C, and roads 1, 2, 3, 4.

In FIG. 3, in a case where the road 1 has a plurality of lanes, even though there is a prominent GS on the left front side of the intersection 1B, the image transmission device 100 determines that acquisition of an image of a prominent GS on the left back side of the intersection 1B is not needed in order to reduce the capacity of uploaded image data or stored image data. The determination described above is performed by the acquisition need determination unit 160.

In a case where the road 1 has a plurality of lanes and a left-hand traffic road, except when the vehicle 10 is traveling on the leftmost lane, there is a possibility that the visual field of the camera 200 is obstructed by another vehicle traveling on the lane on the left side of the vehicle 10 and the image of the prominent GS cannot be acquired. For this reason, in a case where the road 1 on which the vehicle 10 travels has a plurality of lanes, determination is made that acquisition of an image is not needed.

The same applies a case where a prominent GS is at the left back corner of the intersection 1B. A facility is not limited to a prominent GS, and may be all facilities or the like represented by the POIs.

FIG. 4 is a diagram showing the data structure of a database having a POI, a latitude/longitude, and a prominent chain flag associated with one another. The POI is a POI of a facility or the like facing an intersection, and the latitude/longitude is the latitude and longitude representing the position of the POI. The prominent chain flag is a flag representing whether or not a facility corresponds to a prominent chain of a predetermined genre, 1 represents that the facility corresponds to the prominent chain of the predetermined genre, and 0 represents that the facility does not correspond to the prominent chain of the predetermined genre. The database described above may be created in advance and stored in the memory 190.

FIG. 5 is a diagram showing the data structure of a database having a POI, a latitude/longitude, and a genre flag associated with one another. The POI and the latitude/longitude are the same as those in FIG. 4. The genre flag is a flag representing whether or not a facility or the like that the prominent chain flag shown in FIG. 4 is not given corresponds to a predetermined genre, 1 represents that the facility corresponds to the predetermined genre, and 0 represents that the facility does not correspond to the predetermined genre. As shown in FIG. 2C, the genre flag is allocated to a non-prominent GS, a convenience store, a drugstore, a bank, or the like that is not a prominent chain. The database described above may be created in advance and stored in the memory 190.

FIG. 6 is a diagram showing the data structure of a database having a link ID of a road and a multiple-lane flag associated with each other. The link ID of the road is an ID that is allocated to all links (roads) included in the map data. The multiple-lane flag is a flag representing whether or not each link has a plurality of lanes, 1 represents that the link has a plurality of lanes, and 0 represents that the link does not have a plurality of lanes. The database described above may be created in advance and stored in the memory 190. In a case where data described above is included in the map data, the data may be used.

FIG. 7 is a diagram showing the data structure of a database having an intersection ID, a latitude/longitude, an image ID, and a POI associated with one another. The intersection ID is an ID of an intersection (node) included in the map data. The latitude/longitude represents the latitude and longitude of each intersection. The image ID indicates an ID of an image acquired at each intersection. The POI is a POI of a facility or the like included in the image represented by the image ID. FIG. 7 shows the data structure of data stored in the navigation server 500B.

When the image transmission device 100 determines that acquisition of an image is needed, an image of a facility or the like is stored in the memory 190 as a part of the probe data, is uploaded to the probe storage server 500A, and is stored in the navigation server 500B.

Figure 8:
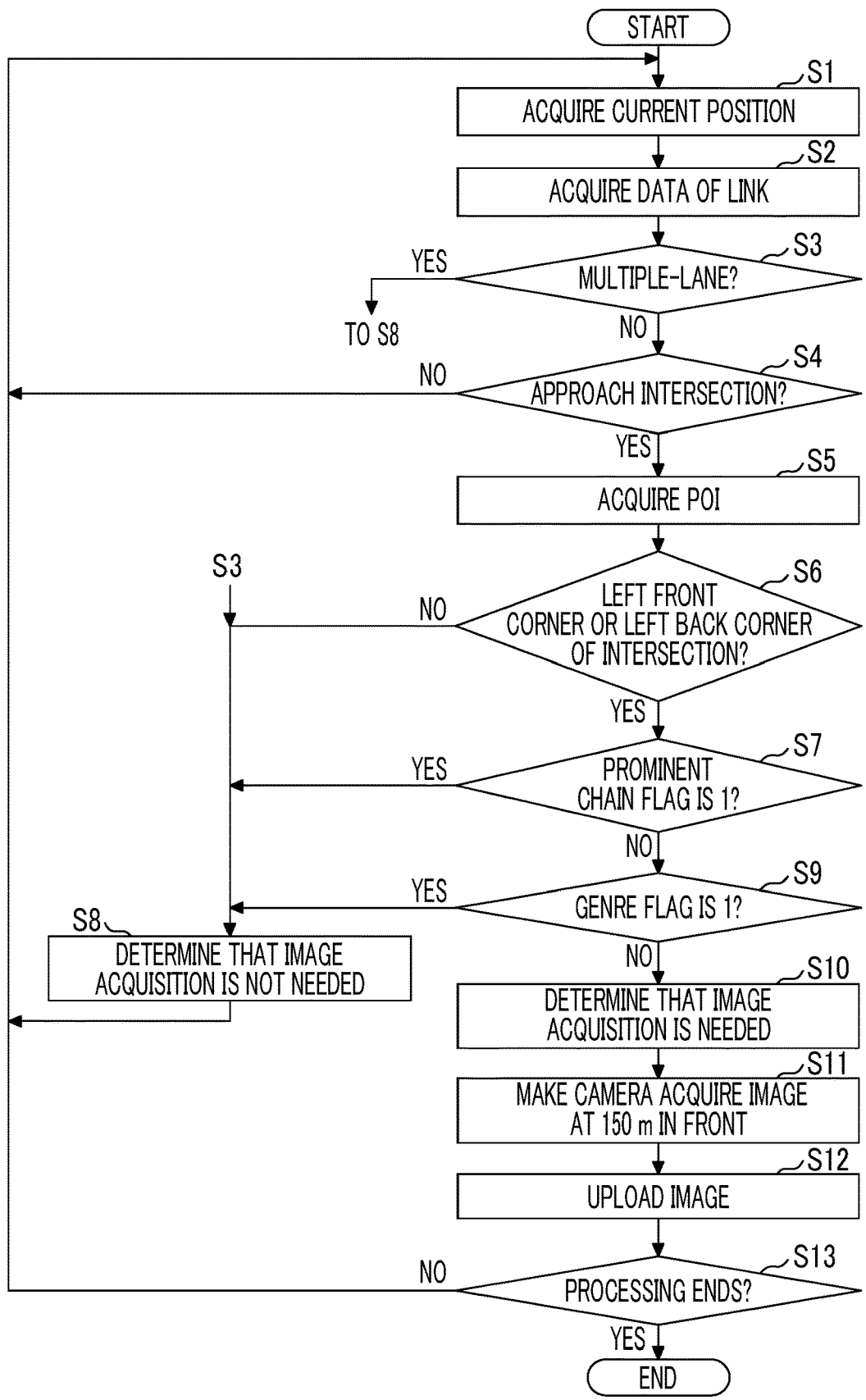
FIG. 8 is a flowchart showing processing that is performed by an image transmission device.

FIG. 8 is a flowchart showing processing that is performed by the image transmission device 100.

As an example, in a case where an ignition switch is turned on, the main controller 110 starts the processing (START).

The position detection unit 120 acquires the current position of the vehicle 10 (Step S1).

The main controller 110 acquires data of a link (road) including the current position of the vehicle 10 (Step S2).

The acquisition need determination unit 160 determines whether or not a road on which the vehicle 10 is currently traveling has a plurality of lanes (Step S3). In the determination of Step S3, determination may be made whether or not the multiple-lane flag associated with the link ID corresponding to the road on which the vehicle 10 is currently traveling is 1 using data shown in FIG. 6.

In a case where the acquisition need determination unit 160 determines that the road does not have a plurality of lanes, the intersection detection unit 130 determines whether or not the vehicle 10 approaches an intersection in the moving direction (Step S4). Determination about whether or not the vehicle 10 approaches the intersection may be performed by acquiring the position (latitude, longitude) of the intersection (node) in the moving direction from the map data, calculating the distance between the current position of the vehicle 10 and the intersection, and determining whether or not the distance between the current position and the intersection is equal to or shorter than 300 m.

The information acquisition unit 150 acquires a POI of a facility or the like at the intersection from the map data stored in the memory 190 (Step S5).

The acquisition need determination unit 160 determines whether or not the facility or the like represented by the POI is at the left front corner or the left back corner of the intersection (Step S6). Determination about whether or not the facility is at the left front corner or the left back corner of the intersection may be performed by determining whether or not the position of the POI is at the left front corner or the left back corner with respect to the position (latitude, longitude) of the intersection acquired in Step S4.

In the processing of Step S6, in a case where the right corner (right front corner or right back corner) or the right side of the intersection is the end, a POI of a facility or the like facing the right side of the intersection is excluded from an image acquisition target.

In a case where determination is made that the facility or the like represented by the POI is at the left front corner or the left back corner of the intersection (S6: YES), the acquisition need determination unit 160 determines whether or not the prominent chain flag is 1 (Step S7). In Step S7, the acquisition need determination unit 160 may read the prominent chain flag associated with the POI to be determined in the database of FIG. 4 and may perform determination.

In a case where determination is made that the prominent chain flag is 1 (S7: YES), the acquisition need determination unit 160 determines that acquisition of the image of the facility or the like indicated by the POI is not needed (Step S8). In a case where the processing of Step S8 ends, the main controller 110 returns the flow to Step S1.

In a case where determination is made that the prominent chain flag is not 1 (S7: NO), the acquisition need determination unit 160 determines whether or not the genre flag is 1 (Step S9). In Step S9, the acquisition need determination unit 160 may read the genre flag associated with the POI to be determined in the database of FIG. 5 and may perform determination.

In a case where determination is made that the genre flag is 1 (S9: YES), the acquisition need determination unit 160 determines that acquisition of the image of the facility or the like indicated by the POI is not needed (Step S8).

In a case where determination is made that the genre flag is not 1 (S9: NO), the acquisition need determination unit 160 determines that acquisition of the image of the facility or the like indicated by the POI is needed (Step S10).

Next, the imaging controller 170 causes the camera 200 to acquire an image from a position 150 m in front of the intersection (Step S11). The camera 200 captures an image, for example, at every 10 m, and the imaging controller 170 performs image processing for object recognition about whether or not an object, such as a building, is included in the image and selects an image including an object, such as a building, as an image for upload. The route search unit 140 may perform communication with the probe storage server 500A and may acquire position data representing a position where an image should be acquired from the probe storage server 500A, and when the vehicle 10 arrives at the position represented by the position data, the imaging controller 170 may cause the camera 200 to acquire an image.

The processing to Step S8 or Step S9 through Step S5, Step S6: YES, and Step S7 is processing that is performed by the image acquisition unit 101 constituted by the information acquisition unit 150, the acquisition need determination unit 160, and the imaging controller 170. The processing to Step S8 through Step S5, Step S6: YES, and Step S7: YES is processing in which the image acquisition unit 101 determines whether or not the camera 200 is caused to acquire the image facing the intersection based on whether or not the mark target facing the intersection is prominent.

The main controller 110 causes the communication controller 180 to upload the image to the probe storage server 500A (Step S12). In the processing of Step S12, the probe data other than the image is also uploaded to the probe storage server 500A along with the image. With this, the probe storage server 500A receives the probe data from the image transmission device 100.

The main controller 110 determines whether or not to end the processing (Step S13). A case of ending the processing is, for example, when the ignition switch is turned off. With the above, a sequence of processing ends.

In Step S3, in a case where the acquisition need determination unit 160 determines that the road on which the vehicle 10 is currently traveling has a plurality of lanes (S3: YES), the flow progresses to Step S8. This is because, in a case where the road has a plurality of lanes, there is no need for acquisition of an image.

In Step S4, in a case where the intersection detection unit 130 determines that the vehicle 10 does not approach the intersection (S4: NO), the main controller 110 returns the flow to Step S1.

In a case where the acquisition need determination unit 160 determines that the facility or the like represented by the POI is not at the left front corner or the left back corner of the intersection (S6: NO), the flow progresses to Step S8, and determination is made that acquisition of the image of the facility or the like indicated by the POI is not needed (Step S8). This is because there is no need for acquisition of the image of the facility or the like on the right side of the intersection.

Figure 9:
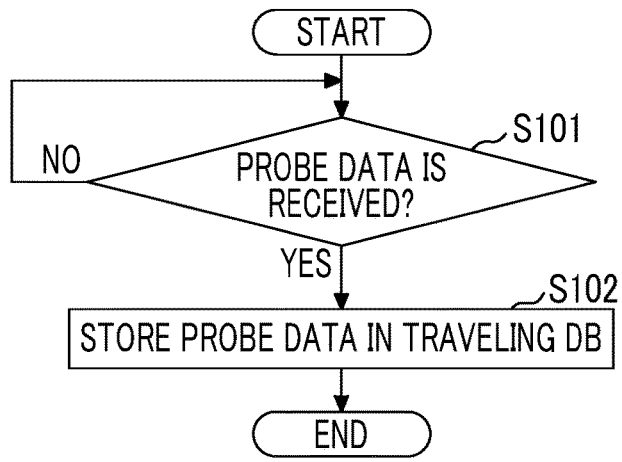
FIG. 9 is a flowchart showing processing that is performed by a probe controller of the probe storage server.

FIG. 9 is a flowchart showing processing that is performed by the probe controller 512A of the probe storage server 500A. In a case where the processing starts (START), the probe controller 512A determines whether or not the probe data is received from the image transmission device 100 (Step S101).

In a case where determination is made that the probe data is received (S101: YES), the probe controller 512A stores the probe data in the traveling DB 600A (Step S102). In a case where determination is made that the probe data is not received (S101: NO), the probe controller 512A repeatedly performs the processing of Step S101. With the above, the processing for one cycle of a control cycle ends (END). The probe controller 512A repeatedly performs the processing from START to END in a predetermined control cycle.

Figure 10:
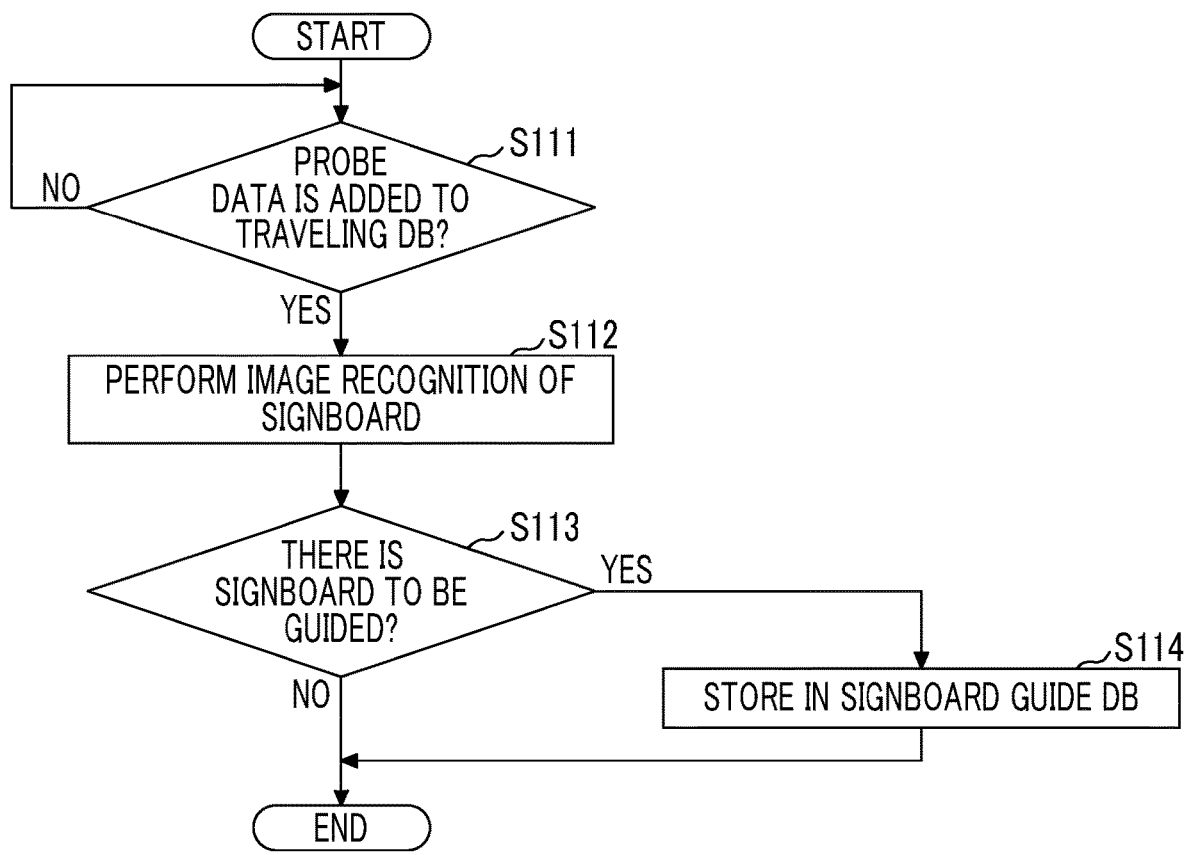
FIG. 10 is a flowchart showing processing that is performed by a signboard guide creation unit of the probe storage server.

FIG. 10 is a flowchart showing processing that is performed by the signboard guide creation unit 513A of the probe storage server 500A. In a case where the processing starts (START), the signboard guide creation unit 513A determines whether or not probe data is added to the traveling DB 600A (Step S111).

In a case where determination is made that the probe data is added (S111: YES), the signboard guide creation unit 513A performs image recognition of a signboard to image data included in the probe data (Step S112). The image recognition of the signboard is processing for performing recognition processing (image processing) about whether or not a character, a number, or the like is included in the image data transmitted from the image transmission device 100.

The signboard guide creation unit 513A determines whether or not there is an image including a signboard in the processing of Step S112 (Step S113).

In a case where determination is made that there is an image including a signboard (S113: YES), the signboard guide creation unit 513A stores the image in the signboard guide DB 600B along with the intersection ID, the latitude/longitude, the image ID, and the POI (Step S114). With this, new data is added to the database shown in FIG. 7.

In a case where the signboard guide creation unit 513A ends the processing of Step S114 or in a case where the signboard guide creation unit 513A determines in Step S113 that there is no image including a signboard (S113: NO), the processing for one cycle of a control cycle ends (END). The signboard guide creation unit 513A repeatedly performs the processing from START to END in a predetermined control cycle.

With the above, according to the embodiment, in a case where the POI at the left front corner or the left back corner of the intersection in the moving direction of the vehicle 10 is a facility or the like of a prominent chain or in a case where the POI corresponds to a predetermined genre, such as a gas station, even though not a prominent chain, acquisition of an image is suppressed. Accordingly, it is possible to efficiently restrain the data capacity of uploaded image data or the capacity of image data stored in the probe storage server 500A and the navigation server 500B from becoming enormous.

Accordingly, it is possible to provide the non-transitory storage medium storing the image transmission program and the image transmission device 100 capable of efficiently collecting an image at an intersection.

Although a form in which, in a case where the POI at the left front corner or the left back corner of the intersection corresponds to a predetermined genre, such as a gas station, even though not a prominent chain, determination is made that acquisition of an image is not needed has been described above, determination may be made that acquisition of an image is not needed solely in a case where the POI is a prominent chain and corresponds to a predetermined genre.

Although a form in which, in a case where the road on which the vehicle 10 travels has a plurality of lanes, image is not acquired has been described, an image may be acquired even in a case where the road has a plurality of lanes. For example, in a case where the POI at the left front corner or the left back corner of the intersection is a facility or the like of a prominent chain or in a case where the POI corresponds to a predetermined genre, such as a gas station, even though not a prominent chain, and in a case acquisition of an image is suppressed, the non-transitory storage medium storing the image transmission program and the image transmission device 100 capable of efficiently collecting an image at an intersection are provided.

Although the processing in a case where the vehicle 10 travels on the left-hand traffic road has been described above, in a case where the vehicle 10 travels on the right-hand traffic road, the right and left in the above processing may be replaced with each other.

Although a form in which the route search unit 140 displays the signboard guide image received from the navigation server 500B on the side of the image of the intersection on the display of the navigation system has been described above, the following may be performed instead of displaying the signboard guide image or in addition to displaying the signboard guide image. The navigation server 500B may perform at least one of image processing and character recognition processing to the signboard guide image to identify a facility name or the like represented by the signboard guide image and may display the identified facility name or the like on the display or read out the facility name through voice guidance.

Although the non-transitory storage medium storing the image transmission program, the image transmission device, and the image transmission method according to the exemplary embodiment of the disclosure have been described above, the disclosure is not limited to the embodiment that is specifically disclosed, and various modifications or alterations can be made without departing from the spirit and scope of the disclosure.

What is claimed is:

1. A non-transitory storage medium storing an image transmission program that is executed on an in-vehicle device mounted in a vehicle having an imaging unit configured to image surroundings of the vehicle to acquire an image and a communication unit configured to perform communication with an information center, the image transmission program comprising:
   an image acquisition step of causing the imaging unit to acquire an image relating to an intersection based on whether or not a mark target facing the intersection is prominent; and
   a transmission step of causing the communication unit to transmit the image acquired to the information center.

2. The non-transitory storage medium according to claim 1, wherein the image acquisition step of the image transmission program includes
   specifying whether or not the mark target is prominent with reference to a database configured to store the mark target in association with information indicating whether or not the mark target is prominent, and
   causing the imaging unit to acquire the image relating to the intersection based on whether or not the mark target is prominent.

3. The non-transitory storage medium according to claim 1, wherein the image acquisition step of the image transmission program includes
   causing the imaging unit to acquire an image relating to the intersection in a case where the mark target is not prominent, and
   causing the imaging unit not to acquire the image relating to the intersection in a case where the mark target is prominent.

4. The non-transitory storage medium according to claim 1, wherein the image acquisition step of the image transmission program includes causing the imaging unit to acquire the image relating to the intersection based on whether or not the mark target is prominent in a case where the mark target is positioned at a left front corner or a left back corner of the intersection in left-hand traffic or at a right front corner or a right back corner of the intersection in right-hand traffic.

5. The non-transitory storage medium according to claim 1, wherein the image acquisition step of the image transmission program includes causing the imaging unit not to acquire the image relating to the intersection in a case where the mark target is positioned at a left front corner or a left back corner of the intersection in left-hand traffic or at a right front corner or a right back corner of the intersection in right-hand traffic.

6. The non-transitory storage medium according to claim 1, wherein the image acquisition step of the image transmission program includes specifying that the mark target is prominent in a case where the mark target is a chain satisfying a predetermined condition or has a predetermined feature in appearance.

7. The non-transitory storage medium according to claim 1, wherein the image acquisition step of the image transmission program includes causing the imaging unit to acquire the image relating to the intersection at a place between a position in front of the intersection by a predetermined distance and the intersection.

8. An image transmission device that is mounted in a vehicle having an imaging unit configured to image surroundings of the vehicle to acquire an image and a communication unit configured to perform wireless data communication with an information center, the image transmission device comprising an electronic control unit configured to:
 cause the imaging unit to acquire an image relating to an intersection based on whether or not a mark target facing the intersection is prominent; and
 cause the communication unit to transmit the image acquired to the information center.

9. The image transmission device according to claim 8, wherein the electronic control unit is configured to
 specify whether or not the mark target is prominent with reference to a database configured to store the mark target in association with information indicating whether or not the mark target is prominent, and
 cause the imaging unit to acquire the image relating to the intersection based on whether or not the mark target is prominent.

10. An image transmission method that is executed on an in-vehicle device mounted in a vehicle having an imaging unit configured to image surroundings of the vehicle to acquire an image, and a communication unit configured to perform communication with an information center, the image transmission method comprising:
 causing the imaging unit to acquire an image relating to an intersection based on whether or not a mark target facing the intersection is prominent; and
 causing the communication unit to transmit the image acquired to the information center.

* * * * *